DE-ENCODABLE DOCUMENTS AND METHODS FOR PREPARATION THEREOF

Filed Feb. 1, 1966

INVENTOR.
MELVIN S. BUROS
BY
William H. Drummond
ATTORNEY 3,293,650
DE-ENCODABLE DOCUMENTS AND METHODS FOR PREPARATION THEREOF Melvin S. Buros, 1520 W. Jackson, Phoenix, Ariz. 85007
Filed Feb. 1, 1966, Ser. No. 524,171
6 Claims. (Cl. 346—1)

Figure 1:
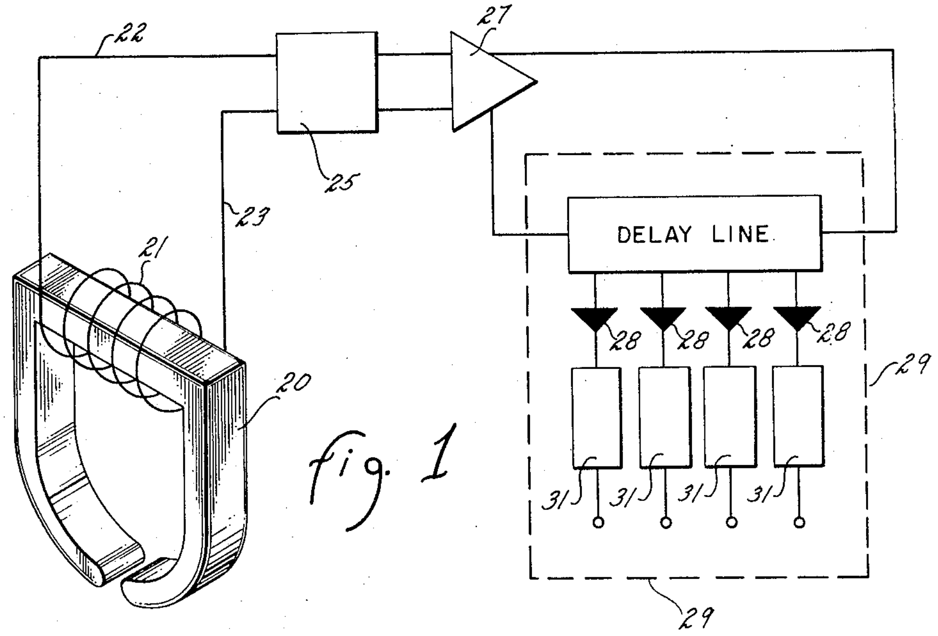

The present invention is an improvement on the inventions disclosed in my United States Patent No. 3,112,151, issued November 26, 1963, on application Serial No. 275,321, filed April 24, 1963, as a continuation-in-part of my then copending application Serial No. 232,226, filed October 22, 1962, and is a continuation-in-part of my copending application Serial No. 232,226, filed October 22, 1962, and now abandoned, and Serial No. 371,567, filed June 1, 1964, now United States Patent No. 3,242,517.

This invention concerns de-encodable machine readable documents. More particularly, the invention concerns machine readable documents which can be de-encoded after machine readable indicia are printed thereon. In a further aspect, the invention concerns machine readable documents which can be de-encoded after preprinted magnetic ink character recognition symbols have been imprinted thereon.

In my issued United States Letters Patent No. 3,112,151, I describe a method for correcting erroneously encoded magnetic ink character recognition symbols on documents used in data processing equipment in which a solvent for the magnetizable indicia is used to distribute and/or absorb portions of the characters and thereby attenuate the magnetic retentivity of the magnetizable characters to render them unrecognizable by data processing equipment. By this means, such characters which have been erroneously encoded upon the data processing document can be removed and replaced by correct characters. The methods disclosed in my said patent have achieved wide acceptance in the banking industry, particularly for correcting erroneously encoded ribbon-inscribed magnetic characters. Such ribbon-inscribed characters are typically and commonly encoded upon the document during the processing thereof such as, for example, during the processing of checks, deposit slips and similar documents. The ribbon-inscribed characters usually indicate the amount of the monetary transaction involved and other pertinent data relating to the particular transaction represented by the document.

Although the methods of my issued patent are very effectively and advantageously employed in the correction of erroneously encoded ribbon-inscribed characters, they have not been practically applied to the correction of so-called "preprinted" magnetic ink character recognition symbols. The methods of my issued patent have not been effectively employed in correcting preprinted symbols as the inks employed in preprinting processes, commonly lithographic, offset or letterpress processes, contain binders and other ink vehicle components which progressively harden during the aging of the document and, therefore, require an inordinate amount of solvent and an excessive time for dissolution, distribution and/or absorption of the magnetic character according to the methods described in my said patent.

Accordingly, it has long been desired to provide a method for correcting erroneously encoded, preprinted magnetic ink character recognition symbols. Furthermore, it has also been long desired to provide a preprinted machine readable document, the preprinted indicia of which can be corrected or changed after the preprinting has taken place.

I have now discovered novel machine readable documents which are de-encodable after preprinting. According to another aspect of the invention, I have discovered novel processes and methods for preparing such documents which are de-encodable. According to a still further aspect of the invention, I have discovered novel machine readable documents and methods and processes for preparing such documents, which documents are de-encodable and correctable by the techniques and methods described in my said issued United States Letters Patent No. 3,112,151 without change in the solvents employed or the manipulative steps thereof. The novel de-encodable, machine readable documents prepared in accordance with the presently known and preferred embodiments of my discovery and invention can also be conveniently de-encoded by the use of apparatus disclosed in my said co-pending application Serial No. 371,567 filed June 1, 1964; which apparatus employs the methods previously disclosed in my said issued patent.

Briefly, in accordance with the presently known and preferred embodiments of my invention and discovery, I provide a machine readable document which is rendered de-encodable by the provision of a film from which machine readable indicia are solvent releasable without damage to the document, the film overlying at least a portion of the so-called "clear band" of the document. The film is applied to the document prior to preprinting of the document and machine readable indicia are thereafter preprinted upon said film by common lithographic, offset or other suitable techniques. The machine readable indicia so imprinted upon the film are then removable and releasable from the document for purposes of de-encodation and subsequent correction by the techniques and methods disclosed in my said issued Patent No. 3,112,151.

The term "clear band" used herein is intended to have the meaning commonly ascribed by those skilled in the data processing arts and indicates a well-defined portion of a machine readable document which is reserved for machine readable indicia such as magnetic ink character recognition symbols, machine readable "visual" recognition symbols and the like, the clear band being maintained free of non-machine readable indicia and being located at a standard location upon the document which registers with the reading heads of sorter-readers and other pieces of data processing equipment and apparatus.

The principal value of the invention and discovery hereof presently is realized in the field of banking, particularly in the preparation of novel bank documents such as checks, deposit slips and the like. As will be apparent as the following description proceeds, such checks, deposit slips and the like comprise an ink-retaining substrate, commonly paper having a clear band for machine readable indicia, and a printable film from which preprinted indicia are solvent releasable without damage to the document, said film overlying at least a portion of said clear band, typically and preferably only that portion which is normally occupied by preprinted recognition characters. According to the present state of development of the data processing machine art, the principles of the present invention and discovery are most advantageously employed in deencoding and correcting machine readable documents which utilize magnetizable indica as machine readable symbols, such as the familiar magnetic ink character recognition ("MICR") symbols. However, it is also contemplated that the articles and methods herein disclosed can be employed to advantage in other machine reading systems such as those in which the reading machine senses the conductance or other electrical properties of the indicia, as well as the so-called "visual" systems now being developed wherein the symbols are "read" by an optical scanning device which does not depend on the magnetic or electrical properties of the symbols for discrimination therebetween. Thus, it has been discovered that the articles and methods herein described can be employed successfully to attenuate the visual and optical characteristics of printed, typewritten, and even hand-written indicia, such that the signal generated by optical reading and sorting equipment would be sufficiently attenuated.

As will be apparent to those skilled in the art, the invention and discovery herein disclosed is not limited to a particular variety of machine readable documents such as bank checks, deposit slips or the like, but is generally applicable to a wide range of machine readable documents used in data processing, information retrieval, and other similar applications.

As previously mentioned, the invention contemplates a film overlying a portion of the clear band of a machine readable document. The term "film" is used herein as a convenience to indicate the nature of the coating which is placed on the clear band to prevent substantial contact between the ink used in imprinting the machine readable indicia and the document substrate. Thus, in a sense, the film is a release coating applied to the substrate to improve the efficiency with which the indicia can be dissolved, distributed and/or absorbed by the solvent as previously described in my issued Patent No. 3,112,151. I have examined documents prepared in accordance with the disclosures hereof and am unable to presently state whether the release material actually forms an imperforate film over the surface of the document substrate or whether it merely coats the individual fibers of the paper or other substrate material in such manner as to inhibit absorption of the printing ink by the substrate. At any rate, I have determined that the printing ink is essentially completely removed by the techniques herein described and the reasonable assumption is that the film is substantially imperforate.

The thickness of the release coating is not highly critical. I have achieved completely satisfactory results with a coating film thickness of less than 0.5 mil, even less than 0.25 mil. On the other hand, thicker coating films are not undesirable unless of a thickness so great as to interfere with the operation of the data processing apparatus.

Although it is not necessary in the preparation of certain types of machine readable documents, I find it highly desired to confine the area of the release film coating to those areas of the document substrate commonly called the clear band, hereabove discussed, for the reason that it is generally desired that the solvent treatment which results in de-encodation affect only the machine readable indicia borne by the document substrate and that other indicia such as typewriting, handwriting and other non-machine readable indicia remain unaffected. This is particularly important in bank documents where, for example, it is a prime requirement that signatures, handwritten amounts, etc., remain unaltered throughout the handling of the document. Thus, in accordance with the preferred practice of the invention, the release film coating is applied only to the portion of the clear band normally occupied by the machine readable indicia and can, for example, be only very slightly greater in width and length than the area actually occupied by the machine readable indicia. In this way, a signature inadvertently placed partly in the clear band will remain virtually unaffected unless the portion of the signature lying in the clear band actually extends into the area occupied by the machine readable indicia.

The material from which the release film coating is formed is not highly critical so long as it possesses the functional properties hereinafter described. First, the film material should be readily printable. The printability of various materials, especially the various film-forming polymeric plastic materials, is well understood and well documented and need not be further herein discussed except to caution that certain materials such as, for example, polyethylene and other polyolefin thermoplastic materials are not readily printable unless treated specially in accordance with methods well known in the art such as by the copolymerization therein of monomeric materials having polar functional groups. On the other hand, other classes of polymeric materials such as, without limiting the generality thereof, various thermosetting polymers such as styrene and various styrene copolymers, are classed as highly "printable" polymers. Also, I have found that various varnish-like and shellac materials form suitably printable films.

A second requirement of the film material is that the machine readable indicia be "solvent releasable" therefrom. By the term "solvent releasable" is meant that the machine readable indicia can be dissolved, distributed and/or absorbed by a treatment with solvent generally in accordance with the principles disclosed in my issued Patent No. 3,112,151. To briefly summarize the techniques disclosed in my said issued patent, the solvent material is chosen to attack the binder of the machine readable characters and so that it will not attack the inks normally used for signatures, watermarks, etc. The de-encodation in accordance with my said issued patent is accomplished by distributing the ink components of the machine readable indicia and/or the absorption of the same from the original area of the imprinted character. This absorption and/or distribution of the machine readable indicia attenuates the signal from the read head of data processing equipment to the degree required to render the original indicia unrecognizable and unreadable by the data processing equipment. The solvent employed is one which attacks the machine readable indicia sufficiently to permit its removal, but which does not dissolve or appreciably or deleteriously affect other indicia on the check such as the watermark, ink signature and printed data, all of which should remain unaffected. Generally speaking, aqueous or alcoholic solvents are ineffective, but many organic solvents such as the low molecular-weight paraffins, chlorides, hydrocarbons, halogen derivatives of hydrocarbons, and various esters, ethers, amides, aldehydes and ketones provide a base from which many usable solvents may be selected. Single solvents or mixtures of solvents may also be used, depending upon the character of the machine readable indicia. For example, methylene chloride, chloroform, carbon tetrachloride, ethylene dichloride, amyl formate, acetates, acetone, petroleum ether, low molecular-weight saturated or unsaturated straight chain or branched chain hydrocarbons, aromatic hydrocarbons such as benzine, toluene and other such aliphatic and aromatic substances are illustrative. The important requirement is not so much the complete solubility of the machine readable indicia as the partial dissolving or softening of the ink vehicle thereof and the avoidance of chemical attack against other indicia on the face of the encoded document.

Of course, the degree of alteration or damage to other indicia than the machine readable indicia desired to be removed can vary in accordance with the specific type of document involved. Thus, for example, the avoidance of smearing or otherwise altering the appearance of a signature or handwritten amount on a bank check is of utmost importance; but on other documents, for example information retrieval documents, the avoidance of alteration or smearing of non-machine readable indicia is not of such critical importance. Therefore, the specific type of film material employed in accordance with the principles of the invention may vary in accordance with the type of document involved since a film material which requires a very strong solvent in order to release the machine readable indicia can be employed where the avoidance of injury to other indicia on the document is less important than in the case of a bank document.

Aside from the aforementioned characteristics of printability and ink release characteristics under solvent treatment, the film material should also exhibit flexibility and resiliency in the very thin cross section contemplated in the present invention. This is desired in order to prevent brittle cracking and flaking during handling of the document which would result in partial unintentional destruction of the machine readable indicia. This quality of flexibility and resiliency is apparently possessed by nearly all the common organic polymers, even some of which are normally considered brittle and inflexible to some degree such as, for example, polystyrene. Surprisingly, polystyrene has been found to be an unusually effective film in the practice of the invention and it is considered that other thermosetting polymers are similarly applicable.

For most applications the film should be essentially colorless so as to interfere as little as possible with the aesthetic appearance and other color characteristics of the document. Obviously, for use in connection with optical data processing systems, the presence of color may be highly undesirable. However, in certain instances it may even be desirable to deliberately color the film material such as, for example, when it is desired to leave an indication of the de-encoding of the document such as on bank documents. When this is desired, a dyed film may be employed so as to visually indicate the previous removal of machine readable indicia.

According to the present understanding of the mechanism by which ink is released from the films, it appears that at least a portion of the film material is dissolved by the solvent during the removal of the machine readable indicia. Accordingly, it appears that those film materials which exhibit substantial solubility in the solvent used for removing the machine readable indicia are preferred in the practice of the invention. Again, polystyrene appears to exhibit the required degree of solubility in mild solvents which can be successfully employed to remove the machine readable indicia without damaging or blurring the non-machine readable indicia as hereabove explained.

The release film coating can be applied to the clear band by any suitable technique. In a presently preferred embodiment of the invention, the film is deposited from a solution of the film material in an appropriate solvent which is volatile enough that the solution dries quickly upon application to the document, leaving the film material upon the surface thereof. Alternatively, many film materials, particularly the thermoplastic materials, may be applied by conventional coating techniques wherein a melt of the polymer is extruded or calendered onto the surface of the document substrate at appropriate points. The solution coating technique can be incorporated in a common lithographic process such that the film can be applied to the appropriate areas of the clear band by lithographic techniques after appropriately adjusting the viscosity and other physical characteristics of the solution to conform to the requirements of the lithographing process.

After the desired areas of the document have been masked or coated as herein disclosed with the film material, the further steps in the preparation of the machine readable document are generally in accordance with those commonly employed in the prior art. Thus, the machine readable indicia are then preprinted upon the film in accordance with standard document printing practices employing conventional inks used in such encoding techniques, for example, the iron-filled inks employed in the magnetic ink character recognition system, or the linen printing ribbon employed in the "COC" optical character recognition system.

After the document has been preprinted, it may then be handled, used, corrected and re-encoded in accordance with the techniques described in my said issued Patent No. 3,112,151. It will be understood that the techniques described in my said issued patent are now, by means of the improvements disclosed herein, applicable not only to the correction of erroneously encoded magnetic characters but also may be used to correct erroneously encoded indicia which are readable by other machine systems such as optical reading systems and the like. In a further aspect, the invention herein disclosed provides a convenient means for initially encoding documents ("mark sensing"), especially the optically readable documents. Thus, the articles and methods herein disclosed can be employed in an encoding system whereby the encoding is accomplished by removing selected machine readable indicia to provide characteristic groups of the symbols remaining which can be translated by the data processing equipment.

Generally speaking, one employs the same types of solvents and the same manipulative steps as disclosed in my said issued Patent No. 3,112,151 in removing either erroneously encoded indicia or, as previously mentioned, the deliberate removal of indicia to provide original encoding. The solvent may be applied by any suitable technique such as the so-called "dauber" method, as disclosed in my said issued patent, or by means of specially designed apparatus as disclosed in my copending application Serial Number 371,567 filed June 1, 1964.

The following examples describe presently preferred embodiments of the invention and discovery chosen for purposes of illustrating the practice thereof to persons skilled in the art.

*Example I*

The following example illustrates the presently preferred practice of the invention and discovery hereof in connection with the correction of erroneously encoded magnetic character recognition symbols.

I prepared a film-forming coating solution by dissolving 5.51 grams of expanded polystyrene in 137.62 grams of a solvent comprising 30 weight percent methylene chloride and 70 weight percent 1,1,1-trichloroethane.

The coating solution prepared as described above was used to coat the clear band of two bank checks prior to preprinting, the coating being accomplished by applying the coating solution to the clear band by means of a dauber. The bank check paper had a porosity of 140 ml./min. prior to coating and 0 ml./min. after coating (TAPPI Test T460m–49) and a smoothness of 180 ml./min. prior to coating and 75 after coating (TAPPI Test T479sm–48). The resulting film which, according to the porosity data was apparently substantially inperforate, had a thickness which was imperceptible when measured by a conventional micrometer having a least graduation of 1 mil.

After the coating solution had dried, leaving the styrene film upon the clear band, the documents were preprinted with magnetic ink character recognition symbols employing a conventional offset duplicator (A. B. Dick Model #360) and A. B. Dick #3–3102C magnetic ink.

The preprinted encoding was "read" by a Kidder Press Whirly-Sig magnetic print tester, the signal being displayed on a Tektronix-type 561 A oscilloscope. The amplitude of the waveform generated by the "on-us" symbol was arbitrarily assigned a value of 100%. The amplitude of the preprinted account field symbols measured 100%.

A solvent composition comprising 30% methylene chloride and 70% 1,1,1-trichloroethane was applied by means of a dauber to the preprinted magnetic character recognition symbols in the account number field in accordance with the techniques disclosed in my issued Patent No. 3,112,151 which, briefly summarized, include the steps of saturating the dauber with the solvent composition and lightly brushing the solvent solution onto the area occupied by the magnetic characters to absorb and/or distribute magnetic ink, thereby attenuating the magnetic retentivity of the characters.

Using the same print test and oscilloscope equipment, the residual magnetic signal from the preprinted account number fields on the two bank checks treated with the methylene chloride-1,1,1-trichloroethane solvent as described above was 5% and 2% respectively of the amplitude generated by the "on-us" character.

The two bank checks with the attenuated account fields were then re-encoded employing a Burroughs T–100 encoding machine using ribbon No. 03-1611-551 which is a Mylar-backed ribbon having a coating of magnetically responsive iron particles in a binder comprising waxes, fats, paraffin hydrocarbons, etc. The re-encoded bank checks were again "read" employing the same magnetic print tester and oscilloscope. Perfect waveforms having 110% peak amplitude on each check were obtained. As a check, I measured the peak amplitude of a fresh ribbon-inscribed "on-us" symbol and determined it to be 110%.

*Example II*

The procedures of Example I are repeated except that the film-forming coating solution is a solution of acrylic resin in a volatile aromatic hydrocarbon solvent (commercially available under the brand name "Glo-Tex Spray Paint No. 74") applied by spraying the solution from a pressurized can employing a dichlorodifluoromethane propellant. The solvent employed to attenuate the magnetic retentivity of the printed magnetic characters is a mixture of 20% isopropyl alcohol, 70% naphtha and 10% methyl ethyl ketone.

Equally satisfactory results are obtained.

*Example III*

The procedures of Example II are repeated except that the film-forming coating solution employed is a solution of nitrocellulose in a ketone-alcohol solvent commercially available under the tradename "Blair Spray Fix," a product of Blair Art Products Inc., Memphis, Tennessee.

Equally satisfactory results are obtained.

*Example IV*

This example illustrates the presently preferred practice of the invention in connection with the correction of erroneously encoded "COC" (coded optical character) recognition symbols.

The paper stock employed in the preparation of the optically readable documents was a high-grade 20-pound stock having a 20% rag content, a thickness of 4.75 mils, a porosity of 30 ml./min. (TAPPI Test T460m-49), and a smoothness of 420 ml./min. (TAPPI Test T479sm-48). The clear band of the documents was coated with the film-forming coating solution of Example I, again producing a film thickness which was imperceptible when measured with a conventional micrometer having a least graduation of 1 mil. The porosity of the paper after coating was zero ml./min., indicating an apparently imperforate film was formed.

Optically readable characters were imprinted upon the coated clear band employing a General Electric 1200 line per minute printer 4WPRT200A2 with COC-5 font option. The printer ribbon was a "Buckeye" LS-4 nylon fabric (Standard Products 33 Nylon) ribbon with R203G ink of MacBeth Density 28 manufactured by Buckeye Ribbon & Carbon Co. The preprinted documents were treated as in Example I with the methylene chloride-methyl chloroform solution to attenuate the optically readable signal. The amplitude of the residual signal obtained after the solvent treatment was less than 10% of the nominal signal obtained prior to solvent treatment.

After removal of the optically readable characters by the solvent treatment and measurement of the residual signal, the documents were re-encoded with COC-5 characters. The signals generated by the re-encoded characters were indistinguishable from the signals generated by the preprinted characters originally inscribed upon the documents. The readability of the characters printed upon the clear band film was significantly improved over that of similar characters imprinted upon uncoated stock.

*Example V*

Test specimens of paper commonly employed for bank checks were coated with the film-forming coating solution of Example I. A standard portable typewriter employing a usual commercially available ribbon was used to imprint characters upon the coated area of the test specimens. The print contrast ratio of the typed characters was determined with a "Kidder Press Optical Character Tester," Model 081, using an 8 mil aperture infrared probe. Prior to solvent treatment, the typed characters exhibited a P.C.R. of .32 which is well within the 0-0.40 range which by industry-accepted print quality standards is "black." Thereafter, the specimens were treated with solvent as in Example I to remove the typed characters. After solvent treatment, the typed characters exhibited a P.C.R. of 0.90 which is well within the 0.70-1.0 range which by industry-accepted print quality standards is "white."

By employing the principles disclosed herein, one can prepare documents having machine readable indicia which are selectively removable for purposes of either correcting erroneously encoded characters or for original encoding, as discussed hereabove. Machine readable characters can be removed selectively for solvent treatment as hereabove discussed by imprinting those characters which are to be permanent prior to the application of the film to the document and imprinting the selectively removable recognition characters upon the film after the film is applied to the document. In this way, solvent treatment of the document will selectively remove only those machine readable indicia which are imprinted after the application of the film to the document, leaving the characters imprinted prior to the application of the film unaffected.

Referring to FIGURE 1, a schematic representation is shown of a reading or a detecting scheme for sensing the premagnetization of magnetizable characters. A core 20 is provided with a winding 21 connected through conductors 22 and 23 to a preamplifier 25. The output of the preamplifier is subsequently supplied to an amplifier 27 which further amplifies the waveshape and provides the amplified voltage waveform to a recognition network indicated generally by the enclosure 29. The recognition network may take the form of a delay line with sufficient storage time to store the entire waveform detected from a given character.

The delay line is tapped along its length and the amplitude of the signal existing at the tapped points is applied to amplifiers 28 and triggers 31. The resulting output is discernible and unique for each different character.

Figures 2, 3:
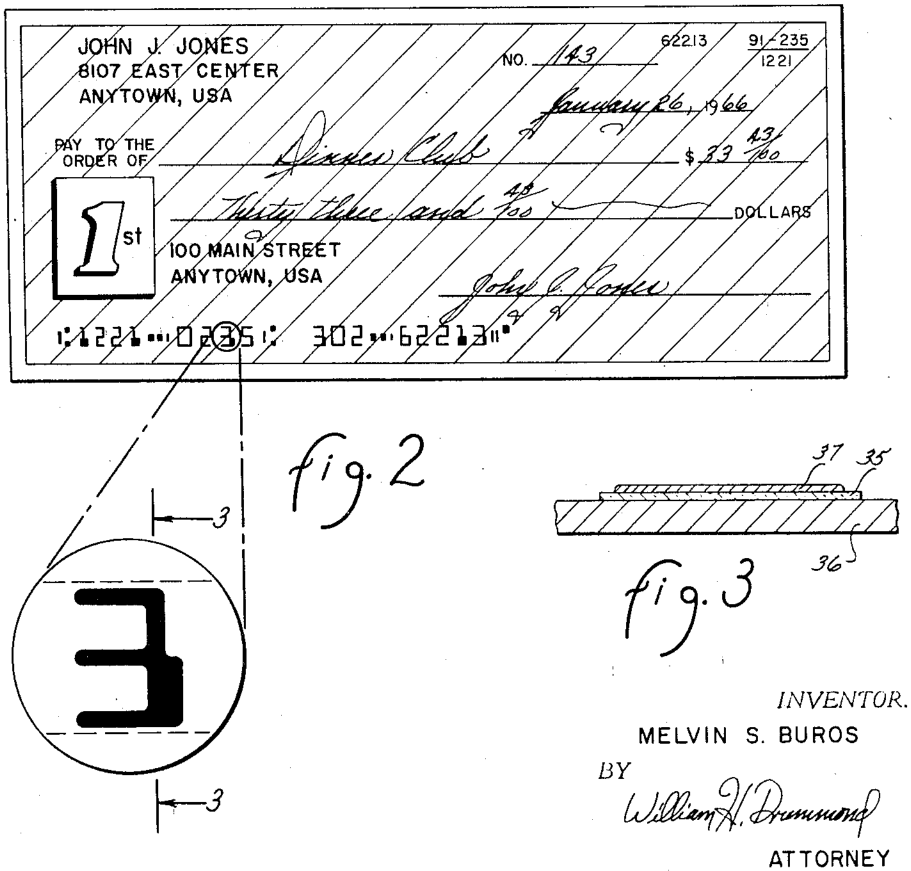

Referring to FIGURE 2, a typical bank check is shown having the now-common MICR characters imprinted along the lower edge thereof. A cross-sectional view of FIGURE 2 is shown in FIGURE 3 to more clearly demonstrate the existence of the otherwise indiscernible release film 35 coating the lower edge of the document 36 and supporting the machine readable indicia 37 thereon.

I claim:

1. A method of preparing a machine readable document having de-encodable recognition characters in the clear band thereof comprising (a) applying to the clear band, prior to imprinting of said recognition characters, a film from which said characters are solvent releasable without injury to the document; and (b) preprinting recognition characters upon said film.

2. Method of claim 1 wherein said recognition characters comprise magnetic ink character recognition symbols.

3. A method of preparing a de-encodable bank check comprising (a) shaping an ink-retaining paper substrate in the form and dimensions of a bank check;

(b) applying to the portion of the clear band of said check normally occupied by magnetic ink character recognition symbols a printable film from which said symbols are solvent releasable without damage to said check;

(c) preprinting magnetic ink character recognition symbols upon said film; and (d) imprinting non-machine readable indicia upon portions of said check other than said clear band.

4. Method of claim 3 wherein said film is applied to said clear band from a vaporizable solvent solution of film-forming material.

5. A de-encodable bank check comprising an ink-retaining paper substrate having a clear band for imprinting magnetic ink character recognition symbols thereupon, a printable film from which preprinted symbols are solvent releasable without damage to the document overlying at least a portion of said clear band, and magnetic ink character recognition symbols preprinted upon said film.

6. A de-encodable bank check comprising (a) an ink-retaining paper substrate bearing non-magnetizable printed indicia and having a clear band for imprinting magnetic ink character recognition symbols thereon;

(b) a film of printable resinous material from which preprinted magnetic ink character recognition symbols are solvent releasable without damage to the document overlying at least those portions of the clear band which are normally occupied by such preprinted symbols; and (c) preprinted magnetic ink character recognition symbols carried by said film.

References Cited by the Examiner

UNITED STATES PATENTS

| | | | |
|---|---|---|---|
| 2,114,462 | 4/1938 | Billings | 101—1 |
| 3,112,151 | 11/1963 | Buros | 346—1 |
| 3,122,448 | 2/1964 | Hills et al. | 346—1 |
| 3,154,432 | 10/1964 | Herrick | 346—1 |

RICHARD B. WILKINSON, *Primary Examiner.*

J. MURRAY, J. W. HARTARY, *Assistant Examiners.*